US006618751B1

(12) United States Patent
Challenger et al.

(10) Patent No.: US 6,618,751 B1
(45) Date of Patent: Sep. 9, 2003

(54) SYSTEMS AND METHODS FOR PUBLISHING DATA WITH EXPIRATION TIMES

(75) Inventors: James Robert Harold Challenger, Garrison, NY (US); Cameron Donald Ferstat, Sleepy Hollow, NY (US); Arun Kwangil Iyengar, Yorktown Heights, NY (US); Paul Reed, Harrison, NY (US); Karen A. Witting, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/378,264

(22) Filed: Aug. 20, 1999

(51) Int. Cl.⁷ .............................................. G06F 13/00
(52) U.S. Cl. ...................... 709/213; 709/203; 709/217; 709/219
(58) Field of Search ................................ 709/200, 201, 709/203, 208, 209, 212, 213, 216, 217, 218, 219

(56) References Cited

U.S. PATENT DOCUMENTS

| | | | | |
|---|---|---|---|---|
| 5,506,902 A | * | 4/1996 | Kubota ........................ | 705/51 |
| 5,734,898 A | * | 3/1998 | He ............................. | 395/619 |
| 5,933,849 A | * | 8/1999 | Srbljic et al. ................ | 711/118 |
| 6,006,034 A | * | 12/1999 | Heath et al. ................. | 395/712 |
| 6,098,093 A | * | 8/2000 | Bayeh et al. ................. | 709/203 |
| 6,138,152 A | * | 10/2000 | Jalote et al. ................. | 709/219 |
| 6,148,299 A | * | 11/2000 | Yoshimoto .................... | 707/8 |
| 6,154,811 A | * | 11/2000 | Srbljic et al. ............... | 711/118 |
| 6,170,013 B1 | * | 1/2001 | Murata ........................ | 709/229 |
| 6,182,077 B1 | * | 1/2001 | Tokumine et al. ............. | 707/10 |
| 6,205,481 B1 | * | 3/2001 | Heddaya et al. .............. | 709/226 |
| 6,219,675 B1 | * | 4/2001 | Pal et al. .................... | 707/201 |
| 6,219,676 B1 | * | 4/2001 | Reiner ........................ | 707/201 |
| 6,292,835 B1 | * | 9/2001 | Huang et al. ................ | 709/235 |
| 6,321,236 B1 | * | 11/2001 | Zollinger et al. ............ | 707/203 |

OTHER PUBLICATIONS

J. Challenger et al., "A Publishing System for Efficienty Creating Dynamic Web Content," IBM Research Report, RC21546, pp. 1–11, Jul. 1999.

* cited by examiner

*Primary Examiner*—Moustafa M. Meky
(74) *Attorney, Agent, or Firm*—Gail H. Zarick; Ryan, Mason & Lewis, LLP (57) ABSTRACT

Systems and methods for publishing objects (e.g., pages and/or fragments) include assigning expiration times to different versions of objects and determining a plurality of objects which should be published atomically, that is, together in a single action. Then, the invention includes computing updated versions of the plurality of objects and atomically publishing the updated versions wherein the updated versions are not available until after expiration times corresponding to previously published versions of at least one of the plurality of objects (e.g., a cached object) have elapsed. Advantageously, clients attempting to access related cached objects over an information network such as the Internet will not be presented with versions of related objects that are inconsistent with one another.

32 Claims, 7 Drawing Sheets

SYSTEMS AND METHODS FOR PUBLISHING DATA WITH EXPIRATION TIMES

FIELD OF THE INVENTION

The present invention relates to publishing of data such as, for example, on information networks such as the Internet, and, more particularly, to systems and methods for publishing data in association with a cache wherein the data has expiration times associated therewith.

BACKGROUND OF THE INVENTION

The Internet or World Wide Web (WWW or the Web) as it exists today, allows data to be cached at various places in the network, such as at proxy servers. Objects which are cached at a proxy server may have expiration times associated with them indicating when they expire. A key problem with caching objects on the Web is that there is often no way to accurately predict in advance when an object should expire. Therefore, it is possible for a proxy cache to contain pages from the same Web site which are inconsistent with each other.

For example, suppose that cached page p1 contains the result from a sporting event with an expiration time of 8:30. At 8:15, a new page p2 is cached at the same proxy server with an updated result of the same sporting event. Between 8:15 and 8:30, the cache may be serving copies of p1 and p2 which are inconsistent with each other. It may be preferable not to cache p2 until the cached version of p1 is invalidated or updated.

Thus, it would be highly advantageous to provide systems and methods for publishing data consistently, for example, in remote caches wherein such systems and methods would be compatible with existing information networks such as the Web and would not require Web sites to be able to push data or invalidation/update messages to remote caches.

SUMMARY OF THE INVENTION

The present invention provides systems and methods for publishing objects, for example, on an information network, such that expiration-sensitive data may be consistently cached. Such inventive systems and methods are compatible with existing information networks such as the Web and do not require Web sites to be able to push data or invalidation/update messages to remote caches. It is to be understood that the term "expiration-sensitive data" refers to available data, for example, data on an information network, that has an expiration time (e.g., time after which the data is no longer valid) associated therewith.

In one aspect of the inventions systems and methods for publishing objects (e.g., pages and/or fragments)include assigning expiration times to different versions of objects and determining a plurality of objects which should be published atomically. Then, the invention includes computing updated versions of the plurality of objects and atomically publishing the updated versions wherein the updated versions are not available until after expiration times corresponding to previously published versions of at least one of the plurality of objects (e.g., a cached object) have elapsed. The term "atomic" refers to the publication of the plurality of objects in a single action, that is, the objects in the plurality are published together.

In another aspect of the invention, systems and methods for publishing objects include caching one or more objects of a first version to be served to a client upon request, for example, via an information network. Further, a release time is assigned to a plurality (e.g., a first bundle) of objects of a second version wherein the release time is no earlier than a time value when each of the cached objects of the first version has expired. Lastly, the first bundle of objects is atomically published in accordance with the assigned release time. Advantageously, clients attempting to access related cached objects over the information network will not be presented with versions of related objects that are inconsistent with one another.

In yet another aspect of the invention, the systems and methods may include the step of combining the first bundle of objects and at least a second bundle of objects and assigning a release time to the combination of the first and second bundles, the release time being no earlier than the maximum release time respectively assigned to the constituent bundles. Then, the first and second bundles are atomically published in accordance with the maximum release time. The publication of such compound bundles reduces or eliminates delays that may be associated with object publication. In a further aspect of the invention, the combination of bundles may be subject to certain constraints that are set to ensure consistency of cached data.

In still a further aspect of the invention, the systems and methods may include the steps of assigning release times to more than one bundle of objects waiting to be published and atomically publishing the bundle having the lowest release time that is consistent with preceding bundles of objects. In this way, the publication order of non-combined bundles may be changed in order to get content published more efficiently.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be explained below in the context of an illustrative Internet or Web implementation. However, it is to be understood that the present invention is not limited to an information network architecture. Rather, the invention is more generally applicable to data publication including, for example, cached expiration-sensitive data with regard to which it is desirable to provide improved consistency between such data.

Figure 1A:
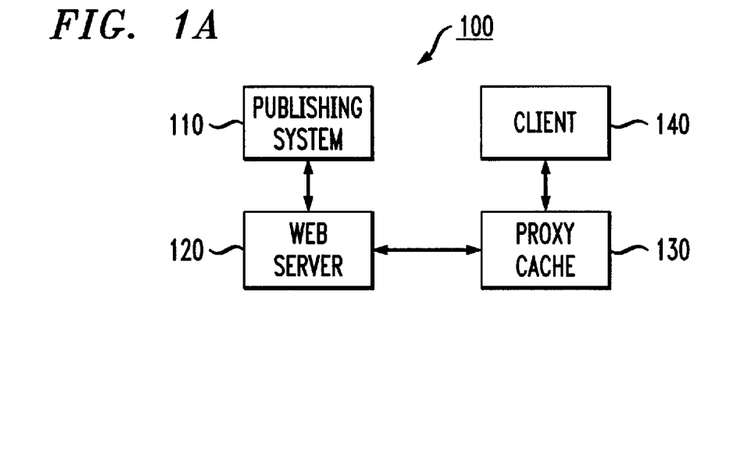
FIG. 1A is a block diagram of an expiration-sensitive data publishing and caching system according to an illustrative embodiment of the invention.

An illustrative embodiment of the invention is depicted in FIG. 1A. As shown, the illustrative system 100 of the invention may include a publishing system 110 which creates Web pages. According to the invention, a plurality of pages, known as a "bundle," is published in a single or atomic action. The bundle might be comprised of pages which have to be published atomically in order to satisfy particular consistency constraints. An example of a constraint is evident from the data inconsistency example discussed above, e.g., the consistency constraint would be not to cache page p2 until the cached version of page p1 is invalidated or updated. Other examples of consistency constraints which maybe applied in accordance with the invention are discussed in the paper by the present inventors entitled: "A Publishing System for Efficiently Creating Dynamic Web Content," IBM Research Report, RC21546, July 1999. When a bundle is published, the pages comprising the bundle are made available to clients 140 from the Web server 120. Web pages may be cached within a proxy cache 130. It is to be appreciated that the system 100 may include multiple publishing systems (110), Web servers (120), proxy caches (130), and/or clients (140).

Various illustrative methodologies for providing publishing data and consistent caching of expiration-sensitive data in accordance with system 100 will be explained below. First, however, an illustrative hardware implementation of one or more of the components of an expiration-sensitive data caching system according to the invention will be discussed.

Figure 1B:
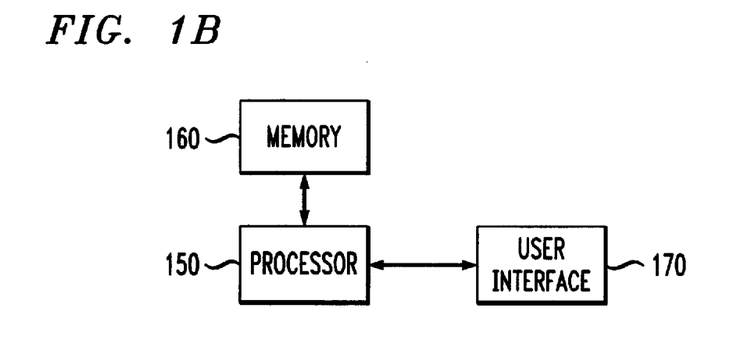
FIG. 1B is a block diagram of an illustrative hardware implementation of one or more of the components of an expiration-sensitive data publishing and caching system according to the invention.

FIG. 1B depicts an illustrative hardware implementation that may be respectively employed, for example, by the publishing system 110, the Web server 120, the proxy cache 130, and/or the client 140. In this particular implementation, a processor 150 for controlling and performing the various operations associated with the illustrative systems of the invention depicted in FIGS. 1, 5, and 6 (FIGS. 5 and 6 will be explained below), is coupled to a memory 160 and a user interface 170. It is to be appreciated that the term "processor" as used herein is intended to include any processing device, including a CPU (central processing unit), which may be utilized in a client computer, server computer, or any other computer employed in conjunction with the invention. Also, the term "processor" may refer to more than one individual processor. The term "memory" as used herein is intended to include memory associated with a processor or CPU, such as, for example, RAM, ROM, a fixed memory device (e.g., hard drive), a removable memory device (e.g., diskette), a flash memory, etc. In addition, the term "user interface" as used herein is intended to include, for example, one or more input devices, e.g., keyboard, for inputting data to the processing unit, and/or one or more output devices, e.g., CRT display and/or printer, for providing results associated with the processing unit. Also, it is to be understood that one or more processing devices within the network may share associated resources.

Accordingly, computer software including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU. In any case, it should be understood that the elements and operations illustrated in the figures may be implemented in various forms of hardware, software, or combinations thereof, e.g., one or more special purpose processors with associated memory, application specific integrated circuit(s), functional circuitry, one or more appropriately programmed general purpose digital computers with associated memory, etc. Given the teachings of the invention provided herein, one of ordinary skill in the related art will be able to contemplate other implementations of the elements of the invention.

Figure 2:
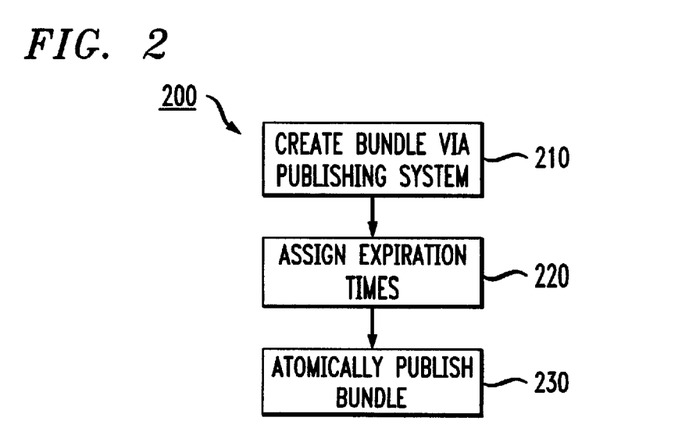
FIG. 2 is a flow diagram of a bundle publishing method according to an illustrative embodiment of the invention.

Referring now to FIG. 2, a flow diagram depicting how portions of the system 100 operate in the context of a process 200 is shown. In step 210, a bundle is created by the publishing system 110. Whenever a cacheable page p is published, the expiration time $exp1(p)$ is maintained by the publishing system 110. In this context, for example, publishing a page means that a publishing system 110 makes a page visible to a client 140 via a Web server 1220 While we do not make the assumption that a Web server 120 has the ability to push data to a proxy cache 130 or client 140, the Web server may in fact have such capability, which may be used in conjunction with the invention. Further, it is to be appreciated that header information accompanying a page may be used to indicate whether a page is capable of being cached, i.e., cacheable. On the Web today, dynamic Web pages and personalized pages associated with cookies are often not considered cacheable by proxy caches, while many other static pages are considered to be cacheable.

Let b1 be a bundle of pages created by the publishing system 110. We cannot necessarily publish b1 immediately and still preserve consistency of remote proxy caches. For example, suppose that the current time is 8:30. Let x and y be cached pages of b1 which both contain common information. Suppose that $exp1(x)=8:31$ and $exp1(y)=10:00$. If we publish b1 immediately, the new version of x may go into a proxy cache after 8:31. Suppose this happens at 8:32. That same proxy cache may continue to cache the old version of y until 10:00. Thus, between 8:32 and 10:00, the proxy cache will serve inconsistent versions of x and y. Thus, an improved method is needed for publishing b1 in order to preserve consistency.

In step 220, the publishing system 110 sets the release time of b1, $RT(b1)$, to be no earlier than the maximum of exp1 values for all elements of b1 which might be cached, i.e., a time when all members of b1 currently cached will have expired. Between the current time and $RT(b1)$, Web server(s) 120 will continue to serve the previous versions of all objects in b1; for those which are cacheable, the system assigns an expiration time no later than $RT(b1)$.

At time $RT(b1)$, b1 is published atomically, in step 230. For objects in b1 which are cacheable, the publishing system 110 attempts to assign similar expiration times to objects likely to be updated at the same time if such a determination can be made.

In some systems, it may be possible to publish b1 before $RT(b1)$. This could be the case if there are delays between when an object is published and when it might be stored in a proxy cache. For example, suppose that b1 includes a cached object o such that it takes at least three seconds for o to appear in a proxy cache after it is published. It might then be possible to publish the new version of b1 two seconds before the previous version of o expires.

This approach can sometimes delay publication of a bundle. However, the system 110 of the invention also has the ability to combine multiple bundles waiting to be published into a single bundle referred to as a "compound bundle." The release time of a compound bundle is no earlier than the maximum of release times for all constituent bundles. Combining bundles can sometimes delay publication of some pages. Thus, the inventive system applies selectivity in combining bundles as depicted in the flow diagram of FIG. 3.

Figure 3:
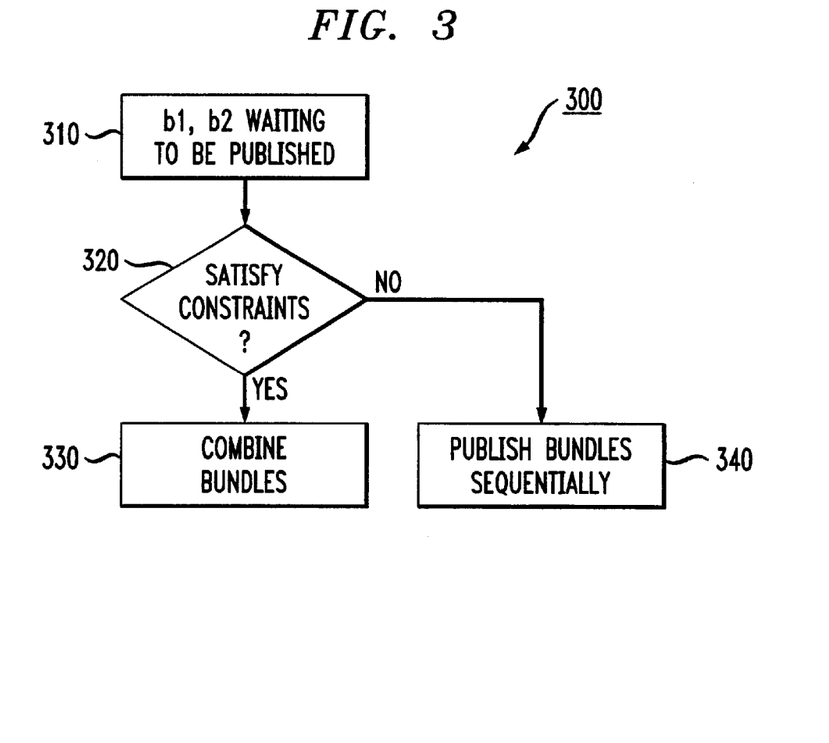
FIG. 3 is a flow diagram of a bundle combining method according to an illustrative embodiment of the invention.

Referring to the process 300 depicted in FIG. 3, b1 and b2 are two bundles awaiting publication (step 310). In step 320, it is determined whether the proper set of constraints for merging the bundles is satisfied. The set of constraints could be,(but is not limited to) the following:

(1) Suppose that b1 is the next bundle to be published. The constraint is to only combine a later bundle b2 with b1 if RT(b2)–RT(b1) is less than a certain threshold and, either:
   (a) b2 is the next bundle to be published after b1, or
   (b) b2 is consistent with all bundles to be published between b1 and b2.

Thus, if the constraints are satisfied, the bundles are combined and published by the publishing system 110 in step 330. If the constraints are not satisfied, the bundles are published sequentially by the publishing system 10 in step 340.

Figure 4:
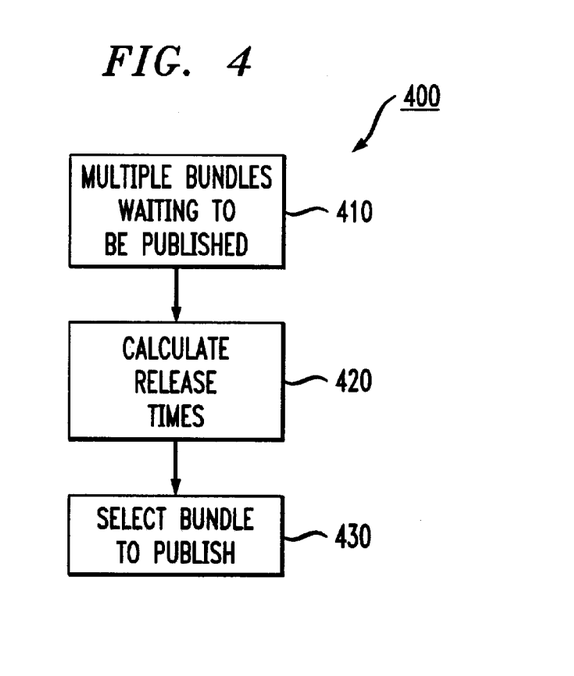
FIG. 4 is a flow diagram of a bundle publishing selection method according to an illustrative embodiment of the invention.

It is also possible to change the order in which un-merged (non-combined) bundles are published in order to get content published more quickly as depicted by the process 400 FIG. 4. In step 410, multiple bundles are waiting to be published. In step 420, the publishing system 110 calculates RT (release time) for each awaiting bundle assuming it were to be the next one to be published (this assumption is necessary because RT for remaining bundles may change after a bundle is published to the outside world, e.g., clients). In step 430, the publishing system 110 publishes to the outside world the bundle with the lowest RT value which is consistent with all bundles ahead of it. In some cases, it is possible to publish one or more pages of a bundle before the release time of the bundle in order to get important information to the outside world. However, this may have the negative effect of violating consistency.

It is to be appreciated that the present invention may be implemented in accordance with one or more of the various embodiments disclosed in the following U.S. patent applications: (i) "Method and System for Rapid Publishing and Censoring Information," by J. R. Challenger, C. D. Ferslat, A. Iyengar, P. Reed, G. Spivak and K. Witting, identifiedby U.S. Pat. No. 09/283,562, still pending, and filed Apr. 1, 1999; (ii) "Method and System for Publishing Dynamic Web Documents," by J. R. Challenger, C. D. Ferstat, A. Iyengar, P. Reed, G. Spivak and K. Witting, Ser. No. 09/283,542, still pending, and filed Apr. 1, 1999; and (iii) "Method and System for Efficiently Constructing and Consistently Publishing Web Documents," by J. R. Challenger, C. D. Ferstat, A. Iyengar; P. Reed and K. Witting, Ser. No. 09/283,561, still pending, and filed Apr. 1, 1999; the disclosures of which are incorporated herein by reference.

Figure 5:
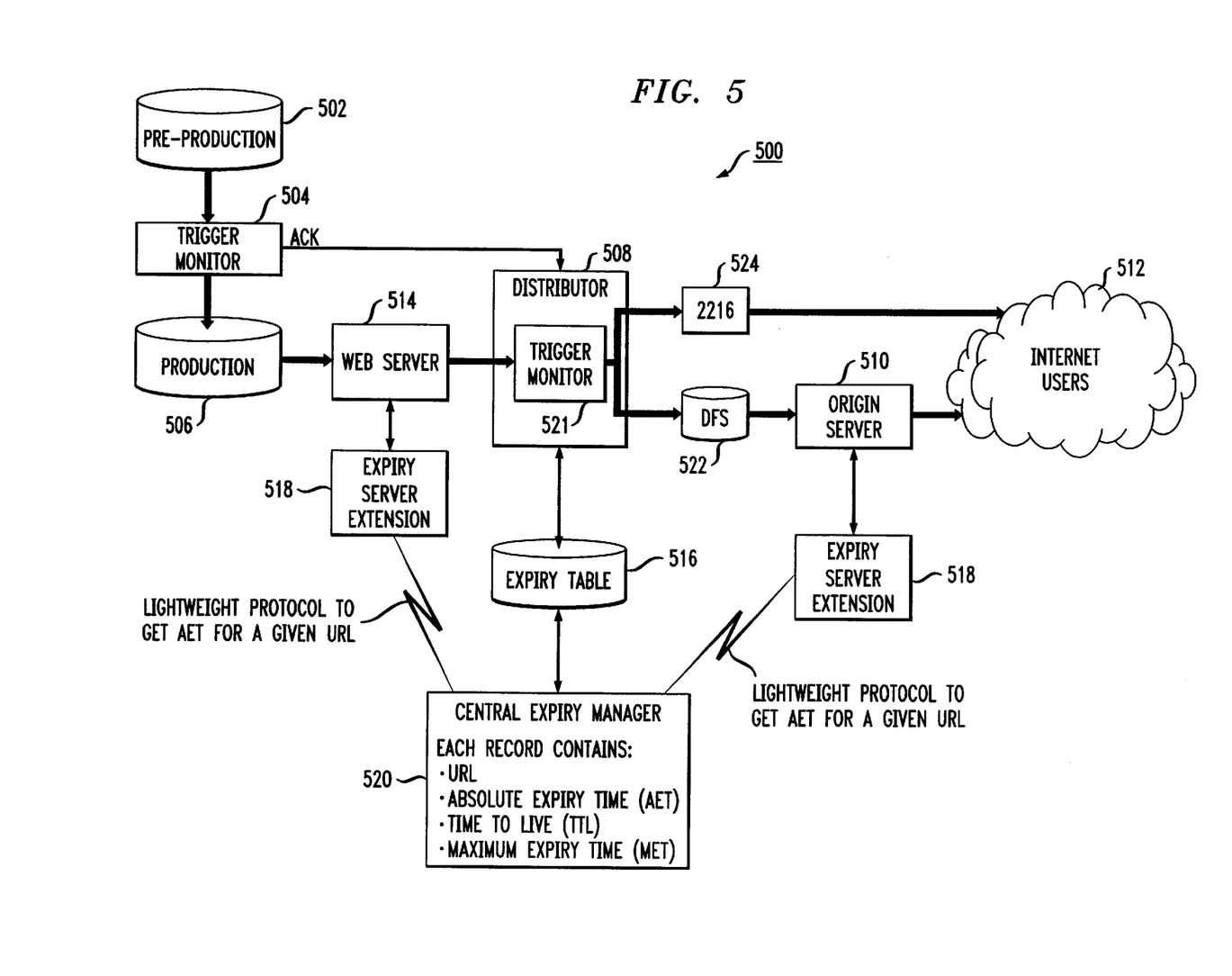
FIG. 5 is a block diagram of an expiration-sensitive data publishing and caching system according to another illustrative embodiment of the invention.
Figure 6:
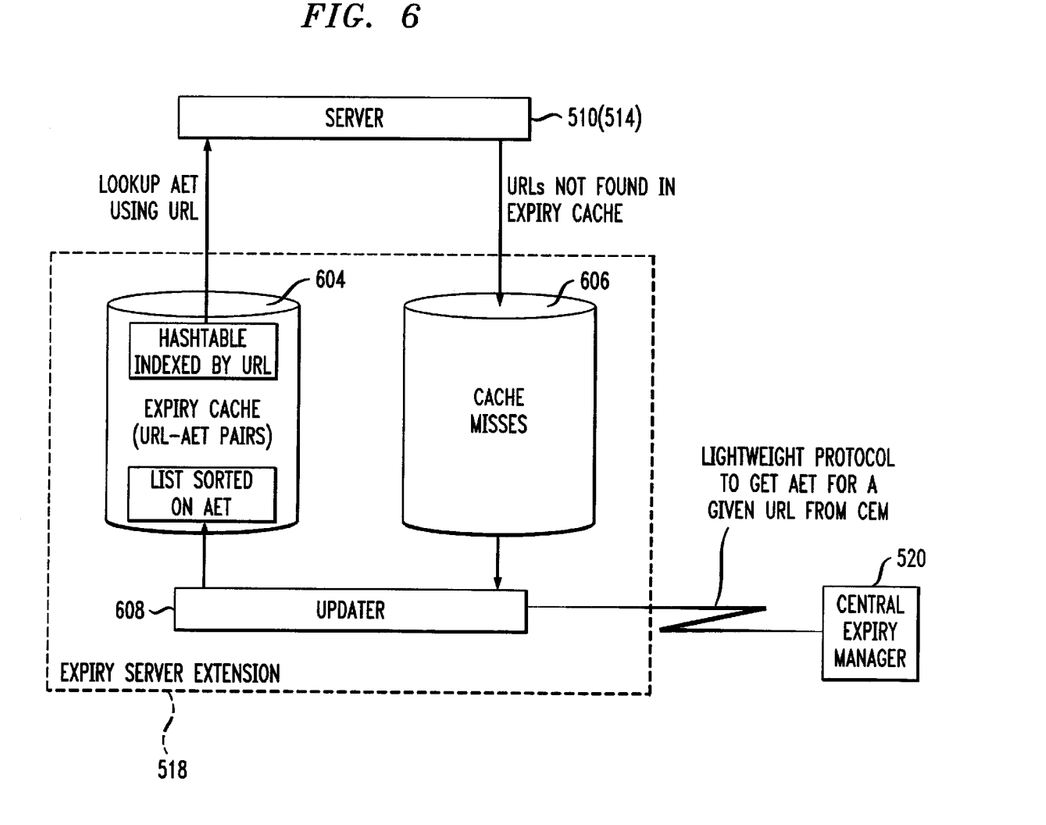
FIG. 6 is a block diagram of an expiry server extension according to an illustrative embodiment of the invention.

Referring now to FIGS. 5 and 6, preferred embodiment of the system and associated methodologies described above is shown in the context of an expiration-sensitive data publishing and caching system 500. It is to be appreciated that the embodiment illustrated in accordance with FIGS. 5 and 6 include one preferred implementation of the elements illustrated in FIG. 1A described above. For example, the publishing system 110 (FIG. 1A) may include the following elements, to be explained below, in FIG. 5: a pre-production stage 502, a trigger monitor 504, a production stage 506, a distributor 508, a Web server 514, an expiry table 516, expiry server extensions 518, a central expiry manager 520, and a trigger monitor 521. The Web server 120 (FIG. 1A) may include the following elements, to be explained below, in FIG. 5: an origin server 510, a DFS 522, and a 2216 unit 524. The proxy cache 130 and client 140 (FIG. 1A) may be included in the Internet users 512 block of FIG. 5. As FIGS. 5 and 6 illustrate one implementation, it is to be understood that the elements illustrated in FIG. 1A may include more, less, or different components than those shown in FIGS. 5 and 6.

In this embodiment, the invention may preferably employ a publishing system as described in the above-referenced paper by the present inventors entitled: "A Publishing System for Efficiently Creating Dynamic Web Content," IBM Research Report, RC21546, July 1999. In that particular publishing system, methods for efficiently creating dynamic Web content are disclosed. Examples of Web sites that provide dynamic content may include sports sites, stock market sites, and virtual stores or auction sites where information on available products and subjects is constantly changing. In order to reduce the overhead of generating dynamic pages from scratch, the publishing system disclosed in the referenced paper composes dynamic pages from simpler entities referred to as "fragments." Fragments typically represent parts of Web pages which change together; when a change to underlying data occurs which affects several Web pages, the fragments affected by the change can easily be identified. It is possible for a fragment to recursively embed another, fragment. The system composes Web pages from simpler fragments. A page is a complete entity which may be served to a client. An object may be either a page or a fragment.

A solution that this preferred embodiment provides with respect to improving data consistency associated with expiration-sensitive cached data may be considered as focusing on two main areas: publishing and serving of expiry information.

Note that expiry information is all about time. It is critical that all machines involved in this process are synchronized to some known time source. Slight drift (e.g., milliseconds) may be tolerable, but anything more than that and the systems performance may degrade. The present invention provides solutions that address these concerns and improves cached data consistency.

Publishing As shown in FIG. 5, dynamic Web content is developed between a pre-production stage 502 and a production stage 506. As is known, these stages may contain such processes as content development, editing and quality assurance. In a preferred embodiment, a bundle of fragments progresses through each of the stages of publishing and is composed by a trigger monitor (TM) 504 located between the pre-production stage 502 and the production stage 506. A trigger monitor is preferably a software module that takes objects from one or more "sources," constructs pages, and writes the constructed pages to one or more "sinks." It is to be understood that a "source" is an input and a "sink" is an output. After the trigger is completed on production, an acknowledgment signal (Ack) is sent from the TM 504 to a distributor 508.

The distributor 508 is a component which serves to distribute content to origin servers (OS) 510 from where the public will access it. The public may be represented in the Internet users block 512. The content may be provided to the distributor 508 by the production stage 506 via Web server 514. The distributor 508 is responsible for holding onto bundles of content until such a time that it can consistently be published, taking into consideration the expiry times of each of the parts of the bundle. TM source-to-sink is then used as the distribution mechanism. That is, a trigger monitor is preferably included in the distributor 508 which is used to move data from one location to another. This is referred to as "transport" or "source-to-sink." Any data moving tool could be employed, e.g., ftp, kermit, etc. It is to be appreciated that the trigger monitor 504 between pre-production and production, as described above, performs functions in addition to moving data, e.g., page assembly, and thus operates as more than just a transport.

Upon receiving the Ack signal from the TM 504, the distributor 508 performs the following operations:

1. Looks up, in an expiry table 516, the Absolute Expiry Time (AET) of all fragments. 110 in the-bundle;
2. Calculates the Release Time (RT) as the latest AET, i.e., the time at which the current version of all fragments will have expired. Objects that have never been published are considered to have an AET of 0.
3. Sets the Maximum Expiry Time (MET) for all fragments to RT;
4. Sleeps (remains substantially inactive) until one second before RT. The distributor could sleep until. RT, but since expiry times preferably have a one second granularity, it can begin working slightly early. This gives the system the potential to have finished processing before everything expires, or if the processing is not complete, this approach reduces the length of time for which expired content is served by a second.

Since bundles are continuously arriving at the production stage 506, the distributor 508 is preferably multi-threaded so it can process multiple bundles in parallel. As with other levels, bundles can merge on production while waiting for the distributor to send them to the OS 510. As a bundle arrives, if it is merged, we preferably ensure that only one thread is dealing with the merged bundle, and that the RT of the now merged bundle is recalculated. So we either kill off (disregard) the already sleeping thread, or code the thread wake-up to handle the fact that the bundle contents may have changed while the distributor was sleeping, and it's RT may have been pushed out, so it will need to sleep a little longer.

Upon waking up, the distributor 508:

1. After dealing with potential merges, the distributor sends a trigger to the TM responsible for moving content from production to OS, i.e., TM 521. This TM will be performing source-to-sink for multiple files in one trigger, where there will be as many sinks as there are OSs. Using a trigger monitor, it is possible to have a number of different OS types. Typically, within the environment this invention may be implemented, this may include a file system, e.g., a DFS (Distributed File System) from Transarc, and a network cache accelerator, e.g., a 2216 from IBM which performs routing: and web server caching. A DFS (shown in FIG. 5 as DFS 522) allows multiple machines to share a common disk or file system over the network. DFS is similar to an AFS (Andrew File System), also from Transarc, an NFS (Network File System) from Sun Microsystems, or an SMB from Microsoft. The DFS is preferred since it is particularly suitable for large scale Web systems or "farms" such as with which the invention may be implemented. A 2216 (shown in FIG. 5 as 2216 524) is part router and part web server cache/proxy. As shown in FIG. 5, the 2216 can serve data to Internet users 512, while the DFS may do the same via origin server 510.
2. When the Ack signal is received for this trigger, the distributor resets MET for all the objects back to the default MAX_INT. MAX_INT is the largest possible integer that the particular system can represent. On systems that use 4 bytes, or 32-bit representations for integer numbers, this would be 2,147,483,647. Typically programming languages provide a constant to represent this number, and in Java this constant is called MAX_INT.

It is to be understood that bundles are being merged in order to ensure that content is consistently published. However, the production stage may provide facilities for clearing data log-jams (back ups) at the expense of consistency. The expiry system may recommend how to break up the bundles to cause the least disruption, e.g., an article can be published without the pages that link it in, it simply won't be surfaced yet. By programmatically analyzing all the items in the log-jam and how they interrelate, it is possible to recommend ways to clear things with minimal breakage.

Similarly, there may be times when content just has to be pushed out, rather than letting the distributor hold it up. A mechanism within the distributor may be made available to force content to be distributed, with the knowledge that for some users they may still be seeing old cached copies, rather than the new ones.

Serving

In parallel to publishing, files are continually being served. Each time a file is served it has expiry headers added to it to enable caches to hold onto the content and serve it. In order to do this, system 500 includes one or more server extensions (service/servlet) 518 which look up the expiry information and add it to each file served. Since the OS infrastructure employed in the context of FIG. 5 is distributed, and users may be served different parts of a page from different complexes, the invention provides for all OSs to work off the same expiry table to ensure content consistency. It is to be appreciated that a complex is a physical location which houses origin servers. Typically, complexes are located where they can be easily connected to the Internet with large amounts of bandwidth available.

One way to achieve that all OSs work off the same expiry table is to take the approach of caching expiry times at the origin servers and refreshing them once they expire from a central source. This can either be done "in-line" as the server serves up the content, or by an external daemon maintaining the expiry cache. The in-line approach may carry more risk since the client must wait for the server to determine the expiry from the remote centralized server. During this time, the user is waiting for the content. The other approach places the effort of updating the cache on another daemon. The external daemon approach will now be described in the context of FIG. 6.

First, as a request comes in for a piece of content, the Web server (510 or 514) calls the server extension 518. This server extension does a look up into a data structure such as a hash table of URLs to get the AET for the content it's trying to serve. If no AET was returned then the URL wasn't found in the cache 604, so it is added to a list of cache misses 606, and the extension returns to let the Web server handle the request as if it hadn't been called, i.e., send a "304" or the actual content.

A "304" is an HTTP return code used to indicate to the client (e.g., a browser or proxy) that the copy it has in it's cache has the same modified time as the copy on the server. When a client initially requests a resource (page, image, etc.), it gets the requested item back together with a set of headers. One of these headers specifies the Last-Modified time of the resource. If the client caches resources locally, subsequent requests for the same resource can include an If-Modified-Since header specifying the Last-Modified time. The server, rather than sending the resource again, can send a "304" back to indicate to the client that it's cached copy is the same as the one of the server. This is a simple form of caching, but the client must still check each resource each time, rather than using expiry headers in which the client can guarantee that the copy it has will be valid until a given time.

If an AET was returned, the "exit" looks to see if it has passed, if it hasn't then it builds an expiry header (and any other headers required to get the content to cache) using the AET. If the AET has passed, then the "exit" returns as it did when not finding the AET. "Exit" in this instance simply means the piece of code/application performing the job. Typically modern programs allow you to add your own plug-in modules to perform specific functions over and above what the original designer produced. These plug-ins are hooked into the program at one of several "exit" points designed in by the original designer. Simply, an "exit" is an API point within an application data flow to which you can attach home-grown code to perform some specialist function.

Second, the other end of this is the updater 608 which keeps the cache fresh and handles cache misses. The updater 608 views the cache sorted by AET such that as each AET passes it can request from a Central Expiry Manager (CEM) 520 what the new AET for that URL should be and update the cache table accordingly. Similarly, for URLs in the list of cache misses, it uses the CEM to get the initial value and inserts it into the cache.

In one embodiment, the cache table is an in memory data structure, which may be pinned since it may grow rather large, e.g., 100,000 URLs, each approximately 80 bytes long, plus expiry time is around 8 Mb. Of course this is a memory table, so restarting the daemon flushes the table. To get over the obvious startup cost of doing this, the updater preferably pre-populates the cache on startup by requesting the working set of AETs from the CEM (the working set being to documents most people are looking at right now).

A disadvantage to not looking up the expired AETs on-demand is that the updater may end up maintaining entries in the table that are no longer being used (since you have no knowledge of the working set that the server is currently serving). One approach to get around this is to tag each time a URL is used and run a least-recently used policy on the table to remove values that are no longer being used and hence reduce the number of redundant updates.

Another solution which precludes the Web server from having to write to the expiry cache (and the locking issues that multiple writers raise) is to add the time that the URL was first put into the cache, and then remove an entry after a certain period of time. This way, old pages that are not being viewed would not be maintained, and more common pages would be recreated since they are being served.

In a preferred embodiment, the URL cache entry time may be combined with the working set pre-population approach wherein the working set is pinned so it does not get flushed. In this embodiment, the cache table is small and the number of redundant updates is reduced.

The expiry table in the CEM contains:
(i) URL—the uniform resource locator or the unique name for the piece of content in question. This URL may be a directory, in which case the values in this row apply to all URLs in that directory, and subdirectories, unless there is an entry for a more specific URL.
(ii) Absolute Expiry Time (AET)—the time at which this URL expires. Typically this will be a number of "seconds since the epoc," i.e., a "long." "Epoc" is a term coined in the UNIX environment to refer to a known point in time. The epoc on UNIX machines is Jan. 1, 1970 and, subsequently, time is measured as the number of seconds since this point in time. Hence, "seconds since the epoc" is the simply a time of day. This number of seconds is stored in a data type called a "long" (short for "long integer").
(iii) Time-To-Live (TTL)—the relative length of time for which a piece of content can be cached in seconds. This is used by the CEM to work out what the new expiry time for a piece of expired content will be.
(iv) Maximum Expiry Time (MET)—normally has the value of MAX_INT, this value is used by the publishing system to "cap" the AET while a piece of content is being held by the distributor. In any process updating, the AET should not update to a value greater than this value.

When the CEM 520 receives a request from an updater, it looks up the given URL in the expiry table, updates it if the AET has passed, and returns the AET to the updater. As stated above, updating an AET using the URLs TTL may be done as follows:

$$AET_{new}=\min(AET+TTL, MET)$$

The CEM handles connections from all the OSs, for example, by maintaining a connection with them to avoid the overhead of establishing the connection. If an OS is disconnected, it retries connecting back to the CEM, with the CEM listening for such connections.

Additionally, the CEM may provide an API (application programming interface) to allow programs to maintain the expiry table, e.g., changing the TTL for a URL or creating a more specific URL in the table.

For scaling and performance, a CEM may act as a cache, itself, and pull values from another CEM rather than calculating values itself. This may be realized in an environment where a global CEM cascades to in complex CEMs, which in turn talk to the updaters on the serving nodes in that complex. For example, we may have a primary CEM in Sydney, with. secondary CEMs in each serving complex. The nodes would hit the secondary CEMs.

Figure 7A:
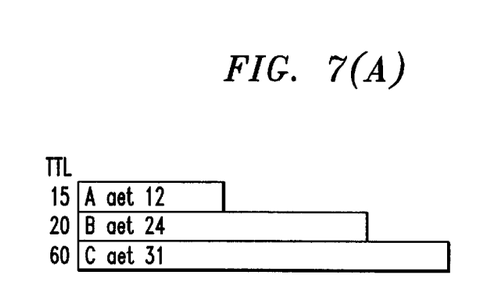
FIGS. 7A through 7C depicts a first part of an example illustrating an expiration-sensitive data publishing and caching method according to the invention.
Figure 7B:
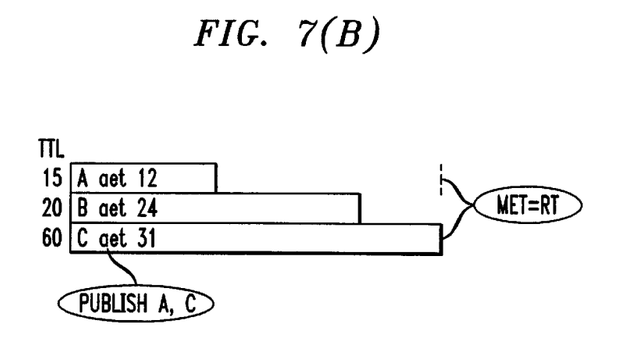
Figure 7C:
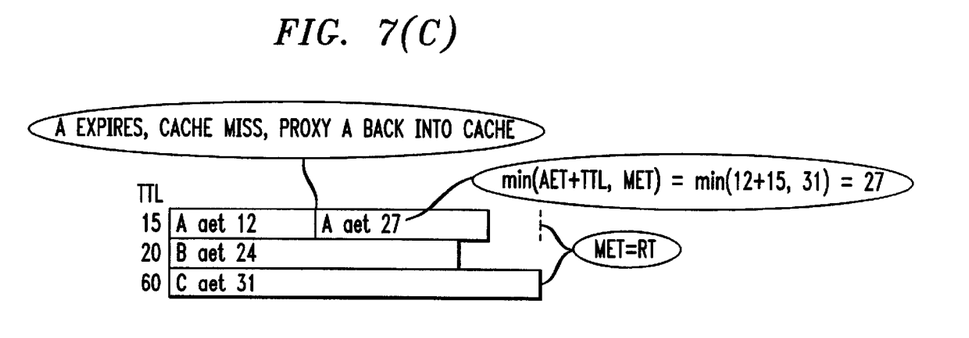

Referring now to FIGS. 7A–7C, 8A and 8B, and 9A and 9B, an example of improved expiration-sensitive data publishing and caching according to the invention is illustrated. In FIG. 7A, suppose we have 3 resources (e.g., pages, images, etc.) on our site, A, B and C. Each is published at time 0 and hence assigned an AET equal to their TTL, i.e., 12, 24 and 31. respectively. IN FIG. 7B, at time 5, someone re-publishes A and C. In order to maintain consistency, we cannot release these new version of A or C until they have both expired, so we calculate the release time (RT) for this file group as time 31, and set all resources in the group to have that as their MET. In FIG; 7C, at time 12, A expires, so we update it's AET by adding it's TTL, ensuring we don't update it beyond it's MET. A's new expiry time is hence 27.

Figure 8A:
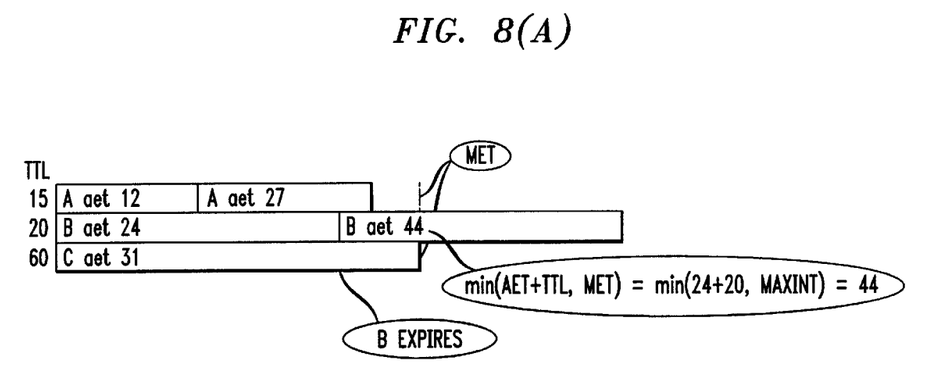
FIGS. 8A and 8B depicts a second part of an example illustrating an expiration-sensitive data publishing and caching method according to the invention.
Figure 8B:
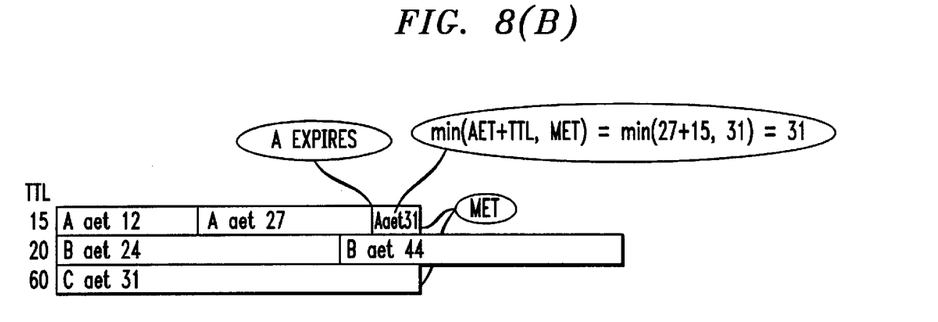

In FIG. 8A, at time 24, expires, so we update it's AET by adding it's TTL. B does not have an MET, so it's new expiry time is 44. In FIG. 8B, at time 27 A expires, so we again update it's AET. This time, MET prevails and A's expiry time is set to 31 since AET+TTL>MET for A.

Figure 9A:
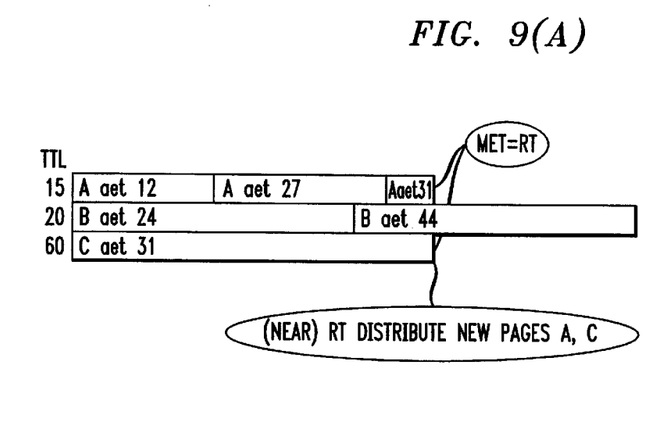
FIGS. 9A and 9B depicts a third part of an example illustrating an expiration-sensitive data publishing and caching method according to the invention.
Figure 9B:
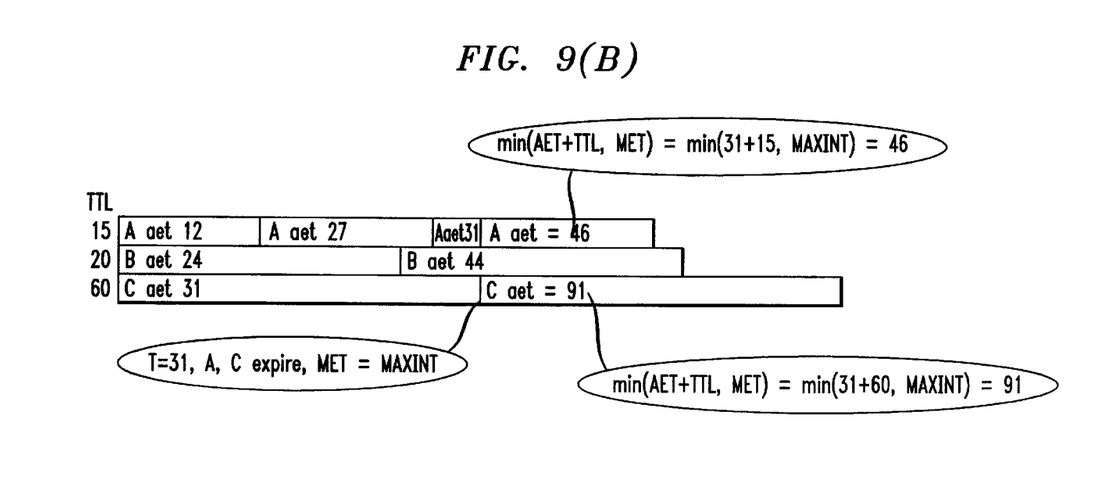

In FIG. 9A, at time 31, we can now release the new copies of A and C and ensure that they will be consistently received by everyone since nobody should be caching the old versions beyond this time. In FIG. 9B, in order to now allow the new versions of A and C to be cached we reset their METs and once again update their AETs into the future by adding their TTL. AET for A becomes 46, and for C becomes 91.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of publishing objects, the method comprising the steps of:
    assigning expiration times to different versions of objects;
    determining a plurality of objects which should be published together in a single action; computing
    updated versions of said plurality of objects; and
    publishing said updated versions together in a single action wherein said updated versions are not available until after expiration times corresponding to previously published versions of at least one of said plurality of objects have elapsed.

2. The method of claim 1, further comprising the steps of:
    combining the plurality of objects (first plurality) and at least one other plurality of objects (second plurality);
    assigning a release time to the combination of the first and second pluralities, the release time being no earlier than the maximum release time respectively assigned to the constituent pluralities; and
    publishing the first and second pluralities together in a single action in accordance with the maximum release time.

3. The method of claim 2, further comprising the step of determining whether a combination of the first and second pluralities satisfy one or more constraints prior to combining them.

4. The method of claim 3, wherein the combination of the first and second pluralities is published together in a single action when it satisfies the one or more constraints.

5. The method of claim 3, wherein the first and second pluralities are sequentially published when the combination does not satisfy the one or more constraints.

6. The method of claim 3, wherein a constraint is that a difference of the constituent release times is not greater than a threshold value.

7. The method of claim 3, wherein a constraint is that the second plurality is the next plurality of objects to be published after the first plurality.

8. The method of claim 3, wherein a constraint is that the second plurality is consistent with respective pluralities of objects to be published between the first and second pluralities.

9. The method of claim 1, further comprising the steps of:
    assigning release times to more than one plurality of objects waiting to be published; and
    publishing together in a single action the plurality having the lowest release time that is consistent with preceding pluralities of objects.

10. The method of claim 1, wherein an object is one of a page and a fragment.

11. The method of claim 1, wherein data is published on the Internet and an object is at least a portion of a Web page.

12. The method of claim 1, wherein said at least one of said plurality of objects comprises at least one cached object.

13. A method of publishing objects, the method comprising the steps of:
    caching one or more objects of a first version to be served to a client upon request;
    assigning a release time to a plurality of objects of a second version, the release time being no earlier than a time value when each of the cached objects of the first version has expired; and
    publishing the plurality of objects together in a single action in accordance with the assigned release time.

14. The method of claim 13, further comprising the steps of:
    combining the plurality of objects (first plurality) and at least one other plurality of objects (second plurality);
    assigning a release time to the combination of the first and second pluralities, the release time being no earlier than the maximum release time respectively assigned to the constituent pluralities; and
    publishing the first and second pluralities together in a single action in accordance with the maximum release time.

15. The method of claim 14, further comprising the step of determining whether a combination of the first and second pluralities satisfy one or more constraints prior to combining them.

16. The method of claim 14, further comprising the steps of:
    assigning release times to more than-one plurality of objects waiting to be published; and
    publishing together in a single action the plurality having the lowest release time that is consistent with preceding pluralities of objects.

17. A system for publishing a plurality of objects, the system comprising:
    at least one publishing system for constructing objects, determining expiration times of objects, and publishing objects together in a single action;
    at least one server operatively coupled to the at least one publishing system for serving published objects to at least one client; and
    at least one cache operatively coupled to the at least one server for storing at least one object remotely from said at least one server.

18. The system of claim 17, further wherein the publishing system combines the plurality of objects (first plurality) and at least one other plurality of objects'(second plurality); assigns a release time to the combination of the first and second pluralities, the release time being no earlier than the maximum release time respectively assigned to the constituent pluralities, and publishes the first and second pluralities together in a single action in accordance with the maximum release time.

19. The system of claim 18, further wherein the publishing system determines whether a combination of the first and second pluralities satisfy one or more constraints prior to combining them.

20. The system of claim 19, wherein the combination of the first and second pluralities is published together in a single action when it satisfies the one or more constraints.

21. The system of claim 19, wherein the first and second pluralities are sequentially published when the combination does not satisfy the one or more constraints.

22. The system of claim 19, wherein a constraint is that a difference of the constituent release times is not greater than a threshold value.

23. The system of claim 19, wherein a constraint is that the second plurality is the next plurality of objects to be published after the first plurality.

24. The system of claim 19, wherein a constraint is that the second plurality is consistent with respective pluralities of objects to be published between the first and second pluralities.

25. The system of claim 17, further wherein the publishing system assigns release times to more than one plurality of objects waiting to be published, and publishes together in a single action the plurality having the lowest release time that is consistent with preceding pluralities of objects.

26. The system of claim 17, wherein an object is one of a page and a fragment.

27. The system of claim 17, wherein data is published on the Internet and an object is at least a portion of a Web page.

28. Apparatus for publishing objects, the apparatus comprising:

at least one processor operable to: (i) cache one or more objects of a first version to be served to a client upon request, (ii) assign a release time to a plurality of objects of a second version, the release time being no earlier than a time value when each of the cached objects of the first version has expired, and (iii) publish together in a single action the plurality of objects in accordance with the assigned release time.

29. The apparatus of claim 28, wherein the processor is further operable to combine the plurality of objects (first plurality) and at least one other plurality of objects (second plurality), assign a release time to the combination of the first and second pluralities, the release time being no earlier than the maximum release time respectively assigned to the constituent pluralities, and publish the first and second pluralities together in a single action in accordance with the maximum release time.

30. The apparatus of claim 29, wherein the processor is further operable to determine whether a combination of the first and second pluralities satisfy one or more constraints prior to combining them.

31. The apparatus of claim 28, wherein the processor is further operable to assign release times to more than one plurality of objects waiting to be published, and publish together in a single action the plurality having the lowest release time that is consistent with preceding pluralities of objects.

32. An article of manufacture for publishing objects, comprising a machine readable medium containing one or more programs which when executed implement the steps of:

assigning expiration times to different versions of objects;

determining a plurality of objects which should be published together in a single action;

computing updated versions of said plurality of objects; and publishing said updated versions together in a single action after expiration times corresponding to previously published versions of said plurality of objects have elapsed.

* * * * *